United States Patent
Aldred et al.

(10) Patent No.: US 11,408,320 B2
(45) Date of Patent: Aug. 9, 2022

(54) EXHAUST MIXER, EMISSIONS CLEANING MODULE AND METHOD OF MANUFACTURE

(71) Applicant: Perkins Engines Company Limited, Peterborough (GB)

(72) Inventors: Mark Aldred, Peterborough (GB); Andrew Howell, Peterborough (GB); Naseer Niaz, Peterborough (GB); Srikanth Tummala, Peterborough (GB); Jean-Yves Tillier, Eindhoven (NL); Matthew Johnson, Peterborough (GB); Edward James Long, Leicestershire (GB); Paul David Gaynor, Leicestershire (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 17/261,482

(22) PCT Filed: Jul. 15, 2019

(86) PCT No.: PCT/EP2019/025235
§ 371 (c)(1),
(2) Date: Jan. 19, 2021

(87) PCT Pub. No.: WO2020/015861
PCT Pub. Date: Jan. 23, 2020

(65) Prior Publication Data
US 2021/0293171 A1    Sep. 23, 2021

(30) Foreign Application Priority Data
Jul. 19, 2018  (GB) .................... 1811820

(51) Int. Cl.
*F01N 3/28*  (2006.01)
*F01N 13/00*  (2010.01)
(Continued)

(52) U.S. Cl.
CPC ........ *F01N 3/2892* (2013.01); *B01F 25/4314* (2022.01); *B01F 25/43151* (2022.01);
(Continued)

(58) Field of Classification Search
CPC ...... F01N 3/206; F01N 3/2066; F01N 3/2892; F01N 13/009; F01N 2240/20;
(Continued)

(56) References Cited

U.S. PATENT DOCUMENTS 6,258,144 B1 * 7/2001 Huang ................. F02M 29/06
                                                     55/482
6,536,420 B1    3/2003 Cheng
(Continued)

FOREIGN PATENT DOCUMENTS

DE    102007012790 A1    9/2008
DE    102008023585 A1    1/2009
(Continued)

OTHER PUBLICATIONS

International Search Report related to PCT Application No. PCT/EP2019/025235 dated Sep. 11, 2019.
(Continued)

*Primary Examiner* — Audrey B. Walter

(57) ABSTRACT

An exhaust mixer apparatus, emissions cleaning module, and a method of manufacturing the exhaust mixer apparatus is provided. The exhaust mixer apparatus comprises an exhaust conduit, a first exhaust mixer and a second exhaust mixer. The exhaust conduit is configured to extend in an elongate direction comprising an inlet and an outlet for transporting exhaust fluid. The first exhaust mixer comprises
(Continued)

a plurality of elongate mixing blades each having a length extending in the elongate direction. Each elongate mixing blade comprising an outer edge extending in the elongate direction and blades are twisted along their lengths such that the outer edge is rotated about the elongate direction. The second exhaust mixer is configured to impart a swirl on an exhaust fluid and spaced apart from the first exhaust mixer in the exhaust conduit.

20 Claims, 10 Drawing Sheets

(51) Int. Cl.
  *F01N 3/20*       (2006.01)
  *B01F 25/43*      (2022.01)
  *B01F 25/4314*    (2022.01)
  *B01F 25/431*     (2022.01)
  *B01F 25/00*      (2022.01)

(52) U.S. Cl.
  CPC ............ *F01N 3/206* (2013.01); *F01N 13/009* (2014.06); *B01F 2025/911* (2022.01); *F01N 3/2066* (2013.01); *F01N 2240/20* (2013.01); *F01N 2260/06* (2013.01); *F01N 2610/02* (2013.01); *F01N 2610/08* (2013.01)

(58) Field of Classification Search
  CPC ............ F01N 2260/06; F01N 2610/02; F01N 2610/08; B01F 5/0614; B01F 5/0617; B01F 2005/0005
  See application file for complete search history.

(56) References Cited

U.S. PATENT DOCUMENTS

| | | | |
|---|---|---|---|
| 8,939,638 B2 | 1/2015 | Palmer | |
| 2008/0267780 A1* | 10/2008 | Wirth | B01F 5/0616 |
| | | | 416/204 A |
| 2011/0113764 A1* | 5/2011 | Salanta | F01N 3/2066 |
| | | | 60/303 |
| 2012/0204541 A1 | 8/2012 | Li et al. | |
| 2012/0320708 A1 | 12/2012 | Geibel | |
| 2013/0170973 A1 | 7/2013 | Staskowiak et al. | |
| 2014/0033686 A1* | 2/2014 | Fischer | F01N 13/08 |
| | | | 60/286 |
| 2015/0101311 A1* | 4/2015 | Keen | F01N 3/2892 |
| | | | 60/274 |
| 2017/0016373 A1 | 1/2017 | Middleton, Jr. | |
| 2017/0314444 A1 | 11/2017 | Yi et al. | |

FOREIGN PATENT DOCUMENTS

| | | |
|---|---|---|
| WO | 201103717 A1 | 6/2011 |
| WO | 2017198292 A1 | 11/2017 |

OTHER PUBLICATIONS

GB Search Report related to Application No. 1811820.8 dated Jan. 11, 2019.

* cited by examiner

EXHAUST MIXER, EMISSIONS CLEANING MODULE AND METHOD OF MANUFACTURE

CROSS-REFERENCE TO RELATED APPLICATION

This Application is a 35 USC § 371 US National Stage filing of international Application No. PCT/EP2019/025235 filed on Jul. 15, 2019 which claims priority under the Paris Convention to Great Britain Patent Application No. 1811820.8 filed on Jul. 19, 2018.

TECHNICAL FIELD

The present disclosure relates to an apparatus for treating exhaust gasses emitted during the operation of an internal combustion engine. In particular, the present disclosure relates to an exhaust mixer and a method of manufacturing an exhaust mixer.

BACKGROUND

Engines, for example internal combustion engines burning gasoline, diesel or biofuel, output various substances. In some circumstances, it may be desirable to process one or more of the output substances. This processing may assist in meeting current and future emissions legislation. Most commonly those substances comprise hydrocarbons (HC), carbon monoxides (CO), mono-nitrogen oxides ($NO_x$) and particulate matter, such as carbon (C), a constituent of soot. The emission of some of those substances may be reduced by careful control of the operating conditions of the engine, but usually it is necessary to provide apparatus, such as an emissions cleaning module, downstream of the engine to treat at least some of those substances entrained in the exhaust fluid.

Various apparatus for reducing and/or eliminating substances in exhaust fluid are known. For example, it is known to provide an oxidation device, such as a diesel oxidation catalyst (DOC), to reduce or to eliminate hydrocarbons (HC) and/or carbon monoxide (CO). Oxidation devices generally include a catalyst to convert those substances into carbon dioxide and water. As a further example, an emissions cleaning modules may include a particulate filter, for example a Diesel Particulate filter (DPF) to restrict the particulates present in the exhaust gas from being output to atmosphere.

By use of an emissions cleaning module, engine emissions can be cleaned, meaning that a proportion of the harmful substances which would otherwise be released to atmosphere are instead converted to carbon dioxide ($CO_2$), nitrogen ($N_2$) and water ($H_2O$).

In addition, it is known to reduce or eliminate mono-nitrogen oxides ($NO_x$) in diesel combustion emissions by conversion to diatomic nitrogen ($N_2$) and water ($H_2O$) by catalytic reaction with chemicals such as ammonia ($NH_3$) entrained in the exhaust fluid. Generally ammonia is not present in exhaust fluids and must therefore be introduced upstream of a catalyst, typically by injecting an additive fluid, for example a urea solution, into the exhaust gas which decomposes into ammonia at sufficiently high temperatures. A selective reduction catalyst (SCR) module may be provided downstream of the injection point to provide the catalyst for reaction with the injected chemicals.

By these methods, exhaust fluids can be treated, meaning that a proportion of the substances which would otherwise be released to atmosphere are instead converted to carbon dioxide ($CO_2$), nitrogen ($N_2$) and water ($H_2O$).

Exhaust systems, which may include an emissions cleaning module, may therefore comprise an injector module for injecting a fluid, such as a urea solution, into the exhaust fluid flow. It is also known to include an exhaust mixer to aid mixing of the injected urea solution with the exhaust fluid flow.

Against this background there is provided an improved exhaust mixer, an improved exhaust mixer apparatus, an improved emissions cleaning module comprising an exhaust mixer. There is also provided an improved method of manufacturing an exhaust mixer.

SUMMARY OF THE DISCLOSURE

According to a first aspect of the disclosure, an exhaust mixer apparatus is provided. The exhaust mixer apparatus comprises an exhaust conduit configured to extend in an elongate direction. The exhaust conduit comprises an inlet and an outlet for transporting exhaust fluid. The exhaust mixer apparatus also comprises a first exhaust mixer and a second exhaust mixer. The first exhaust mixer comprises a plurality of elongate mixing blades each having a length extending in the elongate direction. The elongate mixing blades are connected together along at least part of their lengths and arranged about the elongate direction. Each elongate mixing blade comprises an outer edge extending in the elongate direction. The elongate mixing blades are twisted along their lengths such that the outer edge of each elongate mixing blade is rotated about the elongate direction. The exhaust conduit is configured to locate the first exhaust mixer in an upstream location of the exhaust conduit. The second exhaust mixer is configured to impart a swirl on an exhaust fluid when in use. The second exhaust mixer is arranged in the exhaust conduit downstream and spaced apart from the first exhaust mixer in the elongate direction.

The first exhaust mixer according to the first aspect reduces and/or eliminates the formation of deposits of additives, such as urea, on the first exhaust mixer and/or the exhaust conduit when in use. Additives, such as urea may be added to exhaust fluids which flow through the exhaust mixer for treating exhaust fluids. The first exhaust mixer according to the first aspect reduces and/or eliminates the formation of deposits of additives by at least two mechanisms.

Firstly, the elongate mixing blades of the first exhaust mixer according to the first aspect impart a twist along their lengths. Thus, swirl may be imparted on an exhaust fluid passing through the exhaust mixer apparatus in a gradual manner, rather than presenting one or more mixing blades which are relatively abruptly angled with respect to the direction of flow of the exhaust fluid. Accordingly, the spray impaction provided by the first exhaust mixer may be reduced, thereby reducing the amount of additive liquid which may form on the elongate mixing blades. In general, formation of relatively large quantities of additive liquid on the mixing blades of an exhaust mixer may promote nucleation of deposits.

Secondly, the elongate mixing blades of the first exhaust mixer may provide an elongate surface to promote liquid film transport away from the spray impaction point. Thus, the first exhaust mixer of the first aspect may provide increased evaporation of any liquids which form on the blades as the exhaust fluid flows through the mixer.

In addition to the advantages provided by the first exhaust mixer, the exhaust mixer according to the first aspect also comprises a second exhaust mixer. The second exhaust mixer is provided downstream of the exhaust mixer in order to induce additional swirl in an exhaust fluid flowing through the exhaust mixer apparatus. As the mixing of an additive within the exhaust fluid may increase as the exhaust fluid flows through the exhaust mixer apparatus, the second exhaust mixer which is spaced apart downstream from the first exhaust mixer may be exposed to less unmixed additive (e.g. liquid state-urea) compared to the first exhaust mixer. As such, the second exhaust mixer may be less vulnerable to the formation of deposits of additives. Accordingly, the second exhaust mixer may be provided with a number of swirl blades which may have a higher degree of spray impaction compared to the first exhaust mixer. Thus, the combination of the two mixers is provided to assist in the mixing of the additive with the exhaust fluid whilst reducing and/or eliminating the build-up of deposits of additive on the exhaust mixer apparatus. For example, where urea is used as an exhaust additive, the combination of the two mixers may assist in the conversion of urea from a liquid state to a gaseous state.

According to a second aspect of the disclosure, an emissions cleaning module is provided. The emissions cleaning module comprises an exhaust mixer apparatus according to the first aspect, and an injector module configured to inject an additive fluid into the inlet of the exhaust mixer apparatus.

According to a third aspect of the disclosure, an exhaust mixer is provided. The exhaust mixer comprises a plurality of elongate mixing blades each having a length extending in an elongate direction. The elongate mixing blades may be connected together along at least part of their lengths and arranged about the elongate direction, wherein each elongate mixing blade may comprise an outer edge extending in the elongate direction. The elongate mixing blades may be twisted along their lengths such that the outer edge of each elongate mixing blade is rotated about the elongate direction. The exhaust mixer also comprises a support configured to locate the plurality of elongate mixing blades. The support may be locatable in, or form part of, an emissions cleaning module or exhaust conduit.

According to a fourth aspect of the disclosure, a method of manufacturing an exhaust mixer is provided. The method comprises assembling a plurality of elongate mixing blades each having a length extending in an elongate direction, wherein the plurality of elongate mixing blades are assembled about an axis extending in the elongate direction. The method also comprises attaching at least part of an outer edge of one or more of the elongate mixing blades to a support, wherein attaching the elongate mixing blade to the support imparts a twist about the axis on the elongate mixing blade along its length.

BRIEF DESCRIPTION OF THE DRAWINGS

Embodiments of the present disclosure will now be described, by way of example only, with reference to the accompanying figures in which.

DETAILED DESCRIPTION

According to an embodiment of the present disclosure, an exhaust mixer is provided. In some embodiments, the exhaust mixer may comprise an exhaust mixer blade assembly, and a support. For example, FIG. 1 shows an isometric view of a first exhaust mixer 10 comprising a first exhaust mixer blade assembly 11 and a first support portion 16.

Figure 1:
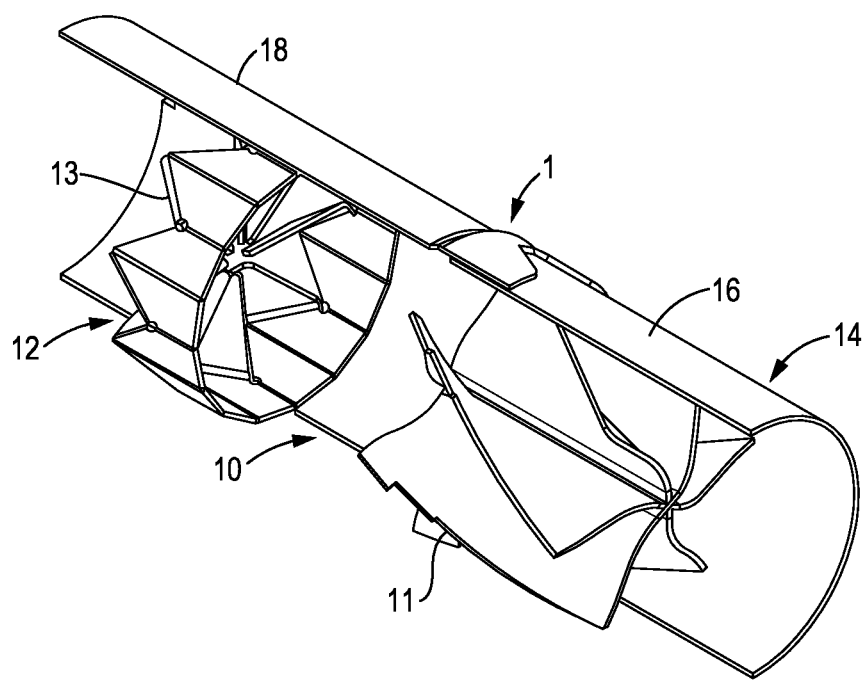
FIG. 1 shows an isometric view of part of an exhaust mixer apparatus according to an embodiment of the disclosure.

Further, according to the embodiment of FIG. 1, an exhaust mixer apparatus 1 according to an embodiment of the present disclosure is provided. In the drawing of FIG. 1, a portion of the exhaust conduit 14 is not shown. As shown in FIG. 1, the exhaust mixer apparatus 1 comprises a first exhaust mixer 10, and a second exhaust mixer 12. The first exhaust mixer 10 comprises a first exhaust mixer blade assembly 11 and a first support portion 16. The second exhaust mixer 12 comprises a second exhaust mixer blade assembly 13 and a second support portion 18. The first and second support portions 16, 18 form at least part of an exhaust conduit 14 for the exhaust mixer apparatus 1.

Figure 2:
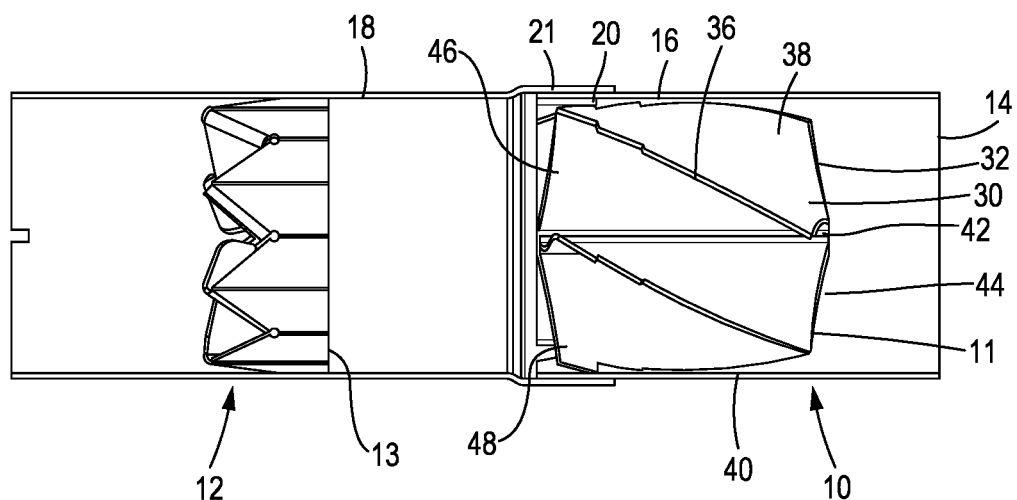
FIG. 2 shows a side sectional view of the exhaust mixer apparatus according to an embodiment of the disclosure.

FIG. 2 shows a side sectional view of the exhaust mixer apparatus 1. The first exhaust mixer blade assembly 11 and the second exhaust mixer blade assembly 13 may be arranged within the exhaust conduit 14. Preferably, the first exhaust mixer blade assembly 11 may be provided in the first support portion 16, and the second exhaust mixer blade assembly 13 may be provided in the second support portion 18. The first and second support portions 16, 18 may include respective joining portions 20, 21 configured to join the first and second support sections 16, 18 together. Accordingly, the first and second support portions 16, 18 may provide an exhaust conduit 14 for exhaust fluid. Thus, in use, exhaust fluid may travel along the exhaust conduit 14 such that it interacts with the first and second exhaust mixer blade assemblies 11, 13.

Figure 3:
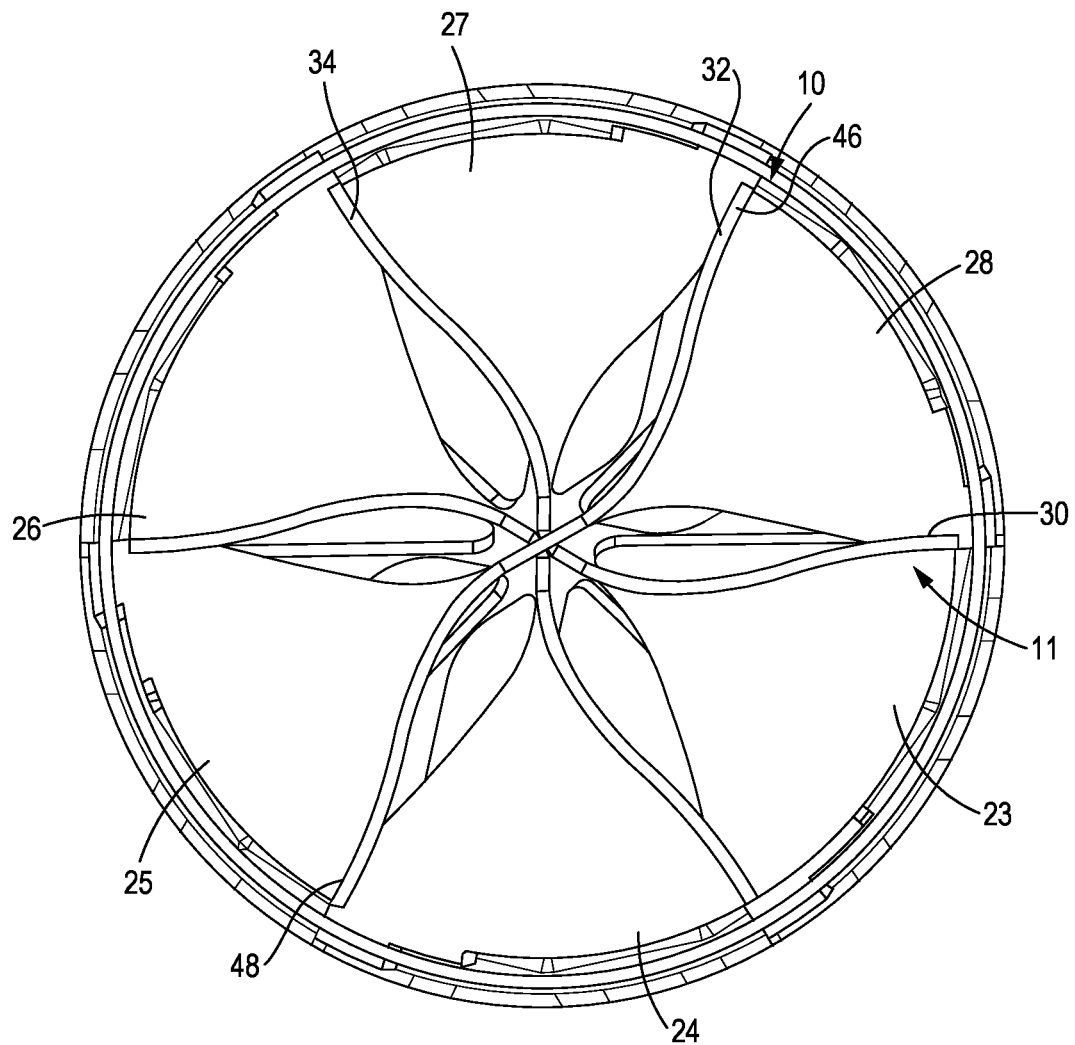
FIG. 3 shows a cross-sectional view of the exhaust mixer apparatus according to an embodiment of the disclosure.

FIG. 3 shows a cross-sectional view of the exhaust mixer apparatus 1 at a point through the first exhaust mixer 10. As shown in the embodiment of FIG. 3, the first exhaust mixer blade assembly 11 comprises a plurality of elongate fins 23, 24, 25, 26, 27, 28. Each of the plurality of elongate fins 23, 24, 25, 26, 27, 28 extends from, and are arranged about a central region of the exhaust mixer blade assembly. The plurality of elongate fins may be interconnected at the central region. Each elongate fin 23, 24, 25, 26, 27, 28 comprises an outer edge away from the central region which extends in the elongate direction. Each of the elongate fins 23, 24, 25, 26, 27, 28 are twisted along their lengths such that the outer edge 36, 38, 40 of each elongate fin 23, 24, 25, 26, 27, 28 are rotated about the elongate direction.

In the embodiment shown in FIG. 3, the plurality of elongate fins 23, 24, 25, 26, 27, 28 are provided by a plurality of elongate mixing blades 30, 32, 34. Each elongate mixing blade 30, 32, 34 provides two (a pair of) elongate fins 23, 24, 25, 26, 27, 28 by extending away in generally opposing directions from the central region. The elongate mixing blades 30, 32, 34 may be interconnected about a substantially central region of each blade. The elongate mixing blades 30, 32, 34 may comprise interlocking portions 50, 56, 64 which interlock with each other in order to be connected together. As such, in the embodiment of FIG. 3, a pair of elongate fins 23, 26 may be constructed from a unitary piece of material. In other embodiments, the each of the plurality of elongate fins 23, 24, 25, 26, 27, 28 may be constructed from a separate piece of material and connected at the central region.

Each elongate mixing blade comprises an outer edge 36, 38 extending in the elongate direction. In the embodiment shown in FIG. 2, each elongate mixing blade 32 has two outer edges 38, 40 on opposing sides of the elongate mixing blade. The elongate mixing blades also include a leading edge 42, 44 a trailing edge 46, 48, and a plate like body extending between the leading edge 42, 44 and the trailing edge 46, 48 defining the outer edge 36, 38, 40 of the mixing blade. As such, the plate like body of each elongate mixing blade 30, 32, 34 extends from the leading edge 42, 44 to the trailing edge 46, 48 in the elongate direction.

Each of the elongate mixing blade 30, 32, 34 may have a generally rectangular shape. The outer edges, leading edges, and/or trailing edges of each of the elongate mixing blades 30, 32, 34 may include a curved section in order to improve the flow of exhaust fluid over the mixing blade. Preferably, the shape of each elongate mixing blade 30, 32, 34 is configured such that the outer edges of the elongate mixing blades 30, 32, 34 extend substantially all the way to the inner walls of the exhaust conduit 14.

As shown in FIG. 2, for example, the elongate mixing blades 30, 32 are twisted along their lengths such that the outer edge 36, 38, 40 of each elongate mixing blade 30, 32 are rotated about the elongate direction.

Each elongate mixing blade 30, 32, 34 has a first length extending in an elongate direction which is arranged to extend in the direction of the exhaust conduit 14. As such, the elongate direction extends generally in the same direction as the outer edges 36, 38, 40 of the elongate mixing blades 30, 32, 34. The elongate mixing blades 30, 32, 34 are connected together along at least part of their lengths. The elongate mixing blades may be connected together along at least part of their lengths in a generally central region of each elongate mixing blade 30, 32, 34. In some embodiments, the elongate mixing blades 30, 32, 34 may be connected together along substantially all of their lengths. The elongate mixing blades 30, 32, 34 are arranged about the elongate direction. As shown in FIG. 3, the elongate mixing blades 30, 32, 34 may be arranged about an axis extending in the elongate direction. The elongate mixing blades 30, 32, 34 may be distributed about the axis. Preferably, the elongate mixing blades 30, 32, 34 are be distributed generally evenly about the axis (i.e. with a generally equal angular distribution). For example, for a first exhaust mixer blade assembly 1 comprising six elongate fins (i.e. three elongate mixing blades), the elongate fins may be distributed every 60° about the axis. Further, the plurality of elongate mixing blades 30, 32, 34 may be arranged about the elongate direction (about the axis) such that a centre of gravity of the plurality of elongate mixing blades 30, 32, 34 is aligned with the elongate direction. As shown in FIG. 3, the elongate mixing blades 30, 32, 34 may be configured such that the centre of gravity of the elongate mixing blades 30, 32, 34 is aligned with a substantially central region of the exhaust conduit. For example, in the embodiment shown in FIG. 1, the exhaust conduit 14 is a substantially straight, cylindrical conduit. Accordingly, a central region of the exhaust conduit 14 may be aligned with a central axis of the exhaust conduit 14. In other embodiments, the exhaust conduit 14 may include a curved portion, or be of varying cross-section, in which case the central region of the exhaust conduit 14 may vary along the length of the exhaust conduit 14.

In one embodiment, the elongate mixing blades 30, 32, 34 may include interlocking portions 50, 56, 64 for connecting the elongate mixing blades 30, 32, 34 together. Each interlocking portion 50, 56, 64 of an elongate mixing blade 30, 32, 34 may comprise an interlocking region 52, 58 66 and one or more slots 54, 60, 62, 68. The slots 54, 60, 62, 68 of each elongate mixing blade are configured to receive an interlocking region of one of the other mixing blades.

Figure 4:
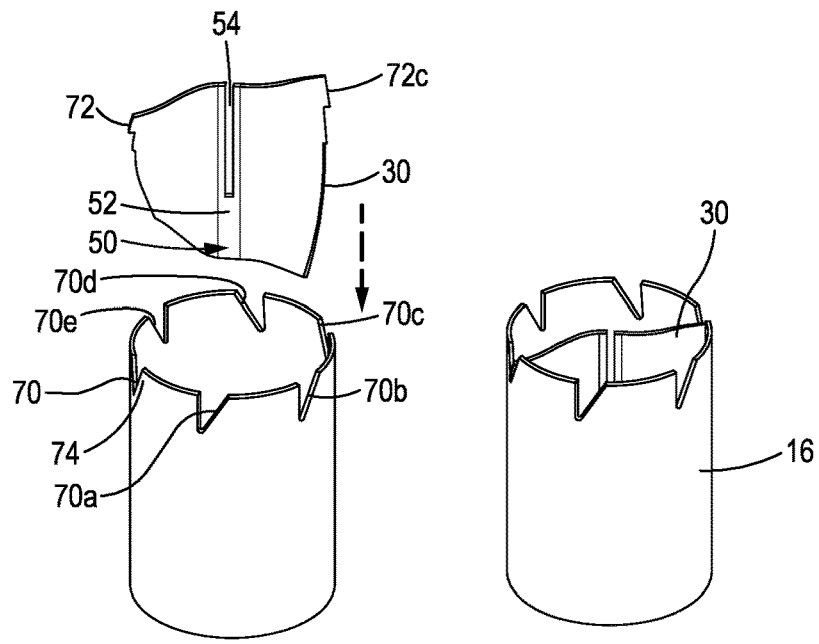
FIG. 4 shows a diagram of a first step for assembling a first exhaust mixer blade assembly as part of a first exhaust mixer according to an embodiment of the disclosure.
Figure 5:
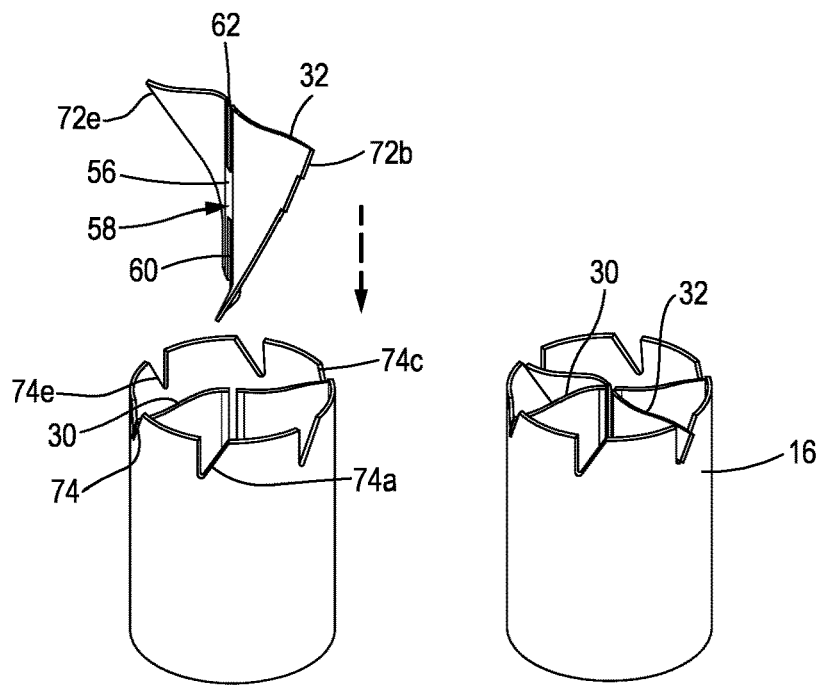
FIG. 5 shows a diagram of a second step for assembling a first exhaust mixer blade assembly as part of a first exhaust mixer according to an embodiment of the disclosure.
Figure 6:
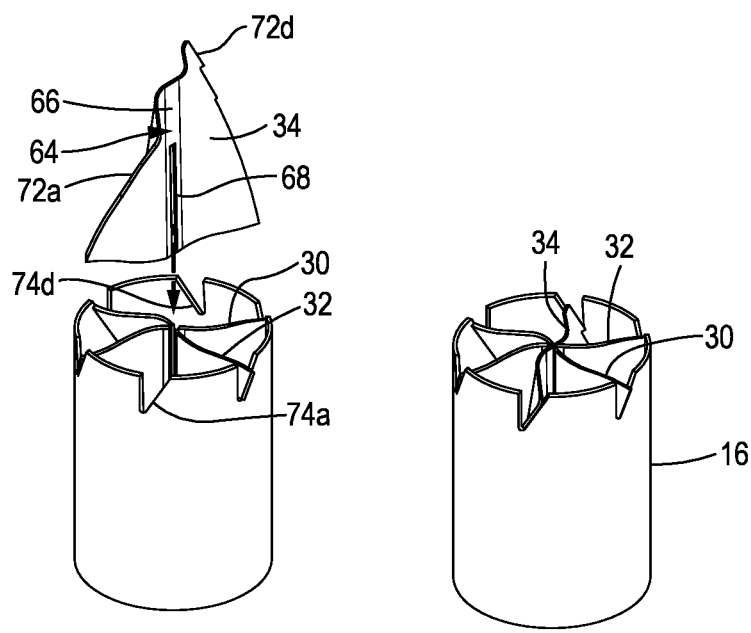
FIG. 6 shows a diagram of a third step for assembling a first exhaust mixer blade assembly as part of a first exhaust mixer according to an embodiment of the disclosure.

For example, FIGS. 4-6 show a series of diagrams for assembling a first exhaust mixer blade assembly 11 as part of a first exhaust mixer 10. The first exhaust mixer blade assembly 11 may comprise three elongate mixing blades 30, 32, 34 which may be inserted into a first support portion 16 to form the first exhaust mixer 10. The first elongate mixing blade 30 shown in FIG. 4 comprises a first interlocking region 52 and a first slot 54. The first interlocking region 54 extends about one third of the length of the first elongate mixing blade 30, as there are three interlocking blades in this assembly. The first slot 54 extends about two thirds of the length of the elongate mixing blade 30, in order to receive two other interlocking regions which each extend about one third of the total length of the elongate mixing blades 30, 32, 34. The first interlocking region 54 of the first elongate mixing blade 30 is arranged at one end of the first elongate mixing blade (in this embodiment, the upstream end).

FIG. 5 shows a second elongate mixing blade 32 including a second interlocking portion 56. The second interlocking portion 56 comprises a second interlocking region 58, a second slot 60, and a third slot 62. Each of the second interlocking region 57, the second slot 60 and the third slot 62 extend about a third of the length of the second elongate mixing blade 32. The second slot 60 may be configured to interlock with the first interlocking region 52 of the first elongate mixing blade 30. The third slot 62 may be configured to interlock with the third elongate mixing blade 34.

FIG. 6 shows a third elongate mixing blade 34 including a third interlocking portion 64. The third interlocking portion comprises a third interlocking region 66 and a fourth slot 68. The fourth slot 68 extends about two thirds of the length of the elongate mixing blade 34, in order to interlock with the two other interlocking regions 54, 58 of the first and second elongate mixing blades 30, 32.

Accordingly, a first exhaust mixer 10 may be provided having interlocking elongate mixing blades 30, 32, 34. In the embodiment discussed above, the first exhaust mixer 10 comprises three interlocking elongate mixing blades. The skilled person will appreciate that in other embodiments, other numbers of interlocking elongate mixing blades may be provided. For example, at least 2, 3, 4, 5, or 6 interlocking elongate mixing blades may be provided, each elongate mixing blade including an interlocking portion. Preferably, no more than eight elongate mixing blades are provided. The skilled person will appreciate that the shapes of the interlocking portions can be modified from the above example to accommodate the desired number of interlocking elongate mixing blades.

As shown in the embodiment of FIGS. 4-6, the plurality of elongate mixing blades 30, 32, 34 may be assembled in a first support portion 16. In the embodiment of FIGS. 4-6, the first support portion 16 may form at least part of an exhaust conduit 14. As such, the first support portion 16 may be substantially tubular, or preferably, a cylindrical tube.

As shown in FIG. 4, the first support portion 16 may comprise a plurality of locating slots 70, 70a, 70b, 70c, 70d, 70e. The plurality of locating slots 70 may be configured to receive the plurality of elongate mixing blades 30, 32, 34 in order to locate the plurality of elongate mixing blades 30, 32, 34.

As shown in FIGS. 4-6, the plurality of elongate mixing blades 30, 32, 34 comprise locating tabs (attachment tabs) 72, 72a, 72b, 72c, 72d, 72e arranged to co-operate with the locating slots 70, 70a, 70b, 70c, 70d, 70e respectively. As such, one locating tab 72 may be provided per locating slot 70. The locating tabs 72 may extend from the outer edges of the elongate mixing blades 30, 32, 34 in order to locate the outer edges of the elongate mixing blade relative to the first support portion 16.

The locating slots 70 may be formed at one end of the first support portion 16. As such, the locating slots 70 may be provided as castellations formed in one end of the first support portion 16. The locating slots 70 may each define a locating slot edge 74, 74a, 74c, 74d, which is angled with respect to the elongate direction. Preferably, the locating slot edge of the locating slot is angled with respect to the elongate direction by at least 20°, and/or no greater than 40°. In some embodiments, the angle of the locating slot edge may be used to induce the desired twist in the elongate mixing blades 30, 32, 34.

Figure 7:
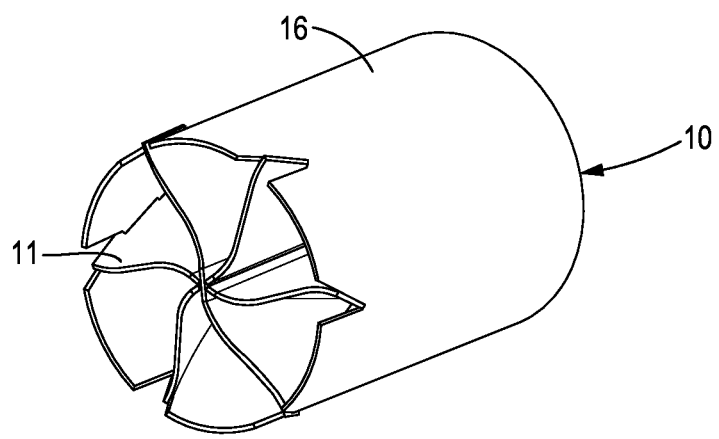
FIG. 7 shows an isometric view of a first exhaust mixer according to an embodiment of the disclosure.

In the embodiment shown in FIG. 7, the locating slots 70 may have a substantially triangular shape. In other embodiments, the locating slots 70 may have a different shape, for example, rectangular. In other embodiments, the locating slots 70 of the first support portion 16 may be formed as through holes spaced away from one end of the first support portion 16.

Thus, when assembled, the combination of the interlocking portions 50, 56, 64 of the elongate mixing blades 30, 32, 34 and the angled locating slot edges 74 may induce a twist in the elongate mixing blades 30, 32, 34 along their lengths. An example of the induced twist can be seen, for example, in the embodiments of FIG. 3. Preferably, the induced twist may be at least 10°. Preferably, the induced twist may be no greater than 40°, or more preferably no greater than 35°. As shown in FIG. 3, the outer edge of each elongate mixing blade 30, 32, 34 can be seen to rotate about the axis by about 30° along the length of each elongate mixing blade (i.e. from the leading edge to the trailing edge).

Figure 8:
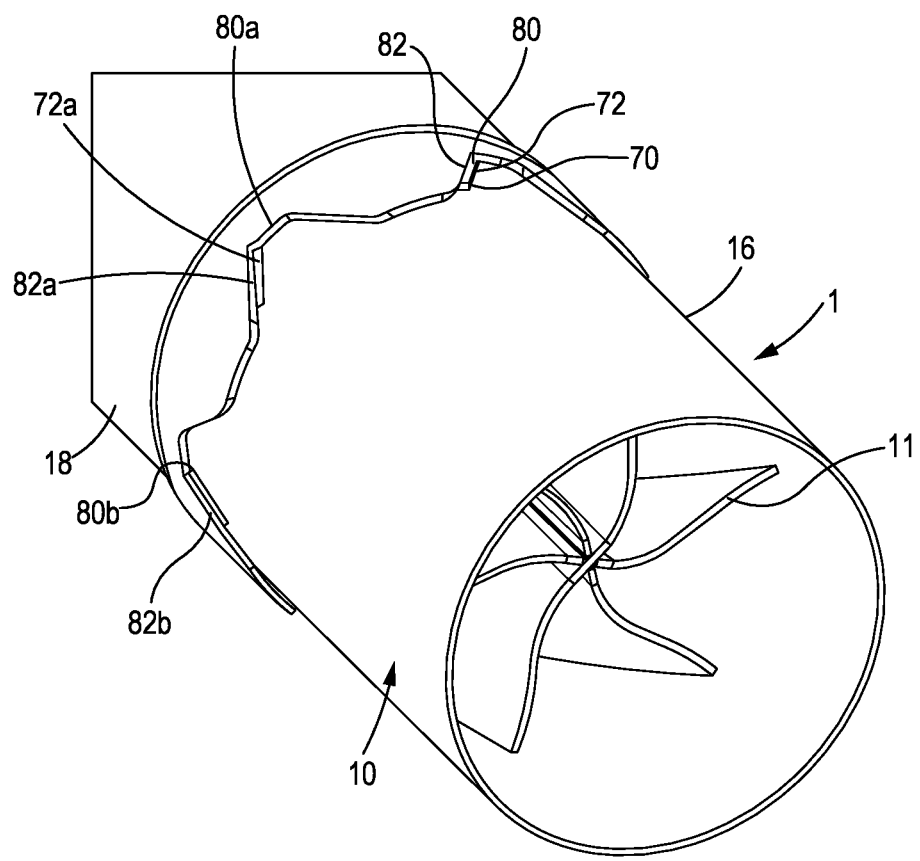
FIG. 8 shows an upstream end view of the exhaust mixer apparatus according to an embodiment of the disclosure.

FIG. 8 shows a diagram of the assembled exhaust mixer apparatus 1 comprising the first exhaust mixer 10, first support portion 16 and the second support portion 18 according to an embodiment of the disclosure. FIG. 8 shows the upstream end of the exhaust mixer apparatus 1.

As shown in the embodiment of FIG. 8, the second support portion 18 may be provided to (co-operatively) locate the first exhaust mixer 10 in combination with the first support portion 16. The second support portion 18 may also comprise a plurality of locating slots 80, 80a, 80b for locating the plurality of elongate mixing blades 30, 32, 34. The plurality of locating slots 80 of the second support portion 18 may be configured to co-operate with the plurality of locating slots 70 of the first support portion 16. As shown in FIG. 8, the plurality of locating slots 80 of the second support portion 18 may be formed at one end of the second support portion 18. As such, the plurality of locating slots 80 of the second support portion 18 may also be provided as castellations formed in the second support portion 18.

Each of the plurality of locating slots 80 of the second support portion 18 may comprise a locating edge 82, 82a, 82b configured to locate a locating tab 72 of the plurality of locating tabs 72, 72a, 72b of the elongate mixing blades 30, 32, 34. The locating slots 80 of the second support portion 18 are configured to provide a locating edge 82 on an opposing side of a locating tab 72 to the locating edge 74 of the of the slots 70 of the first support portion 16. As shown in the embodiment of FIG. 8, the locating slot 82 of the second support portion 18 may also be angle with respect to the elongate direction to correspond to the angle of the edge 74 of the first support portion 16. Accordingly, the first and second support portions 16, 18 may be provided to locate the first exhaust mixer blade assembly 11 in an exhaust conduit 14. This arrangement may also be used to impart a twist on the outer edges 38, 40, 42 of the elongate mixing blades 30, 32, 34.

In other embodiments, it will be appreciated that the provision of co-operative locating slots and tabs may be reversed. As such, the first support portion may provide locating tabs which co-operative with locating slots formed on the elongate mixing blades in order to locate the first exhaust mixer relative to the first support/exhaust conduit.

Preferably, each elongate mixing blade 30, 32, 34 had a length of at least 30 mm, or more preferably at least 40 mm. By providing the elongate mixing blades with such a length, any exhaust additive fluid that collects and travels along the elongate mixing blade has an increased amount of time in which it may be evaporated. Accordingly, the mixing efficiency of such a mixing blade may be increased. Preferably, the length of each elongate mixing blade 30, 32, 34 is no greater than 200 mm, or more preferably no greater than 150 mm. By providing the elongate mixing blades with such a length, the total surface area of the mixing blades may be limited. That is, longer mixing blades may, in some circumstances be more prone to condensation of exhaust fluid additive. In one exemplary embodiment, each elongate mixing blade 30, 32, 34 may be about 90 mm long.

Each of the elongate mixing blades 30, 32, 34 of the first exhaust mixer 10 may be formed from a sheet material. Preferably, the sheet material is a sheet metal. For example, the sheet metal may be stainless steel. Each of the elongate mixing blades 30, 32, 34 may be formed as a single part cut from the sheet material. Any suitable method for cutting sheet material may be used as is known in the art.

As discussed above, the exhaust mixer apparatus 1 may also comprise a second exhaust mixer 12. In some embodiments, the second exhaust mixer 12 is a swirl mixer configured to impart a swirl on an exhaust fluid when in use. The second exhaust mixer 12 may be located in, or form part of, the exhaust conduit 14 downstream from the first exhaust mixer 12. The second exhaust mixer 12 may be spaced apart from the first exhaust mixer 10, such there may be a length of exhaust conduit 14 between the first and second exhaust mixers 10, 12 in which no mixing apparatus is provided (i.e. in use, the exhaust fluid may flow without obstruction between the first and second exhaust mixers).

Preferably, the second exhaust mixer 12 is spaced apart from the first exhaust mixer 10 by at least 10 mm, or more preferably at least 30 mm. As such, the second exhaust mixer blade assembly 13 may be spaced apart from the first exhaust mixer blade assembly 11 by at least 10 mm. Accordingly, the time taken for the exhaust fluid to travel from the first exhaust mixer 10 to the second exhaust mixer 12 may be increased. Such an increase in time may allow a plume of exhaust fluid to develop more evenly across the second exhaust mixer 12. Preferably, the second exhaust mixer 12 is spaced apart from the first exhaust mixer 10 by no greater than 350 mm. Accordingly, a more compact exhaust mixer apparatus 1 may be provided.

Figure 9:
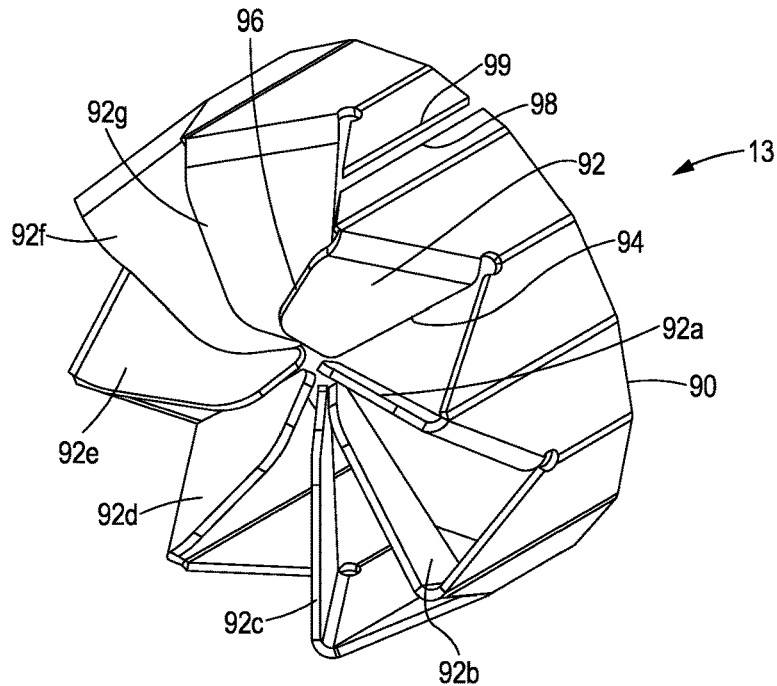
FIG. 9 shows an isometric view of a second exhaust mixer blade assembly according to an embodiment of the disclosure.

FIG. 9 shows an isometric view of a second exhaust mixer blade assembly 13 according to an embodiment of the disclosure. The second exhaust mixer blade assembly 13 comprises an annular support 90 and a plurality of swirl blades 92, 92a, 92b, 92c, 92d, 92e, 92f, 92g. The annular support 90 is configured to extend around an inner surface of the exhaust conduit 14. The annular support 90 provides a supporting portion for each of the plurality of swirl blades 92. The annular support 90 is in turn connected to the second support portion 18 of the exhaust conduit 14 to locate the plurality of swirl blades 92 with respect to the exhaust conduit 14.

The plurality of swirl blades 92 extend from the annular support 90. As shown in FIG. 9, the plurality of swirl blades 92 may extend from the annular support 90 towards a central region of the annular support 90. When arranged in the second support portion 18 of the exhaust conduit 14, said central region may correspond to the central region of the exhaust conduit 14. Preferably, at least 4 swirl blades 92 may be provided. More preferably, at least: 5, 6, 7, or 8 swirl blades may be provided.

Each swirl blade 92 may comprise an upstream edge 94 extending from the annular support 90, and a downstream edge 96 extending from the annular support. Each swirl blade 92 may be formed from a plate like body which extends between the upstream edge 94 and the downstream edge 96.

Each swirl blade 92 may be angled with respect to the elongate direction. That is, the plane formed by each swirl blade 92 between the upstream edge 94 and the downstream edge 96 may be angled (inclined) with respect to the elongate direction of the exhaust conduit 14. As such, a direction in which the plate-like body of each swirl blade 92 extends is inclined relative to the elongate direction. Preferably, an angle of inclination of the direction in which the plate like body of each swirl blade extends is at least 5°, and/or no greater than 30°. Accordingly, the amount of swirl imparted by the second exhaust mixer 12 may be adjusted depending on the angle of inclination of each of the swirl blade 92.

Figure 10:
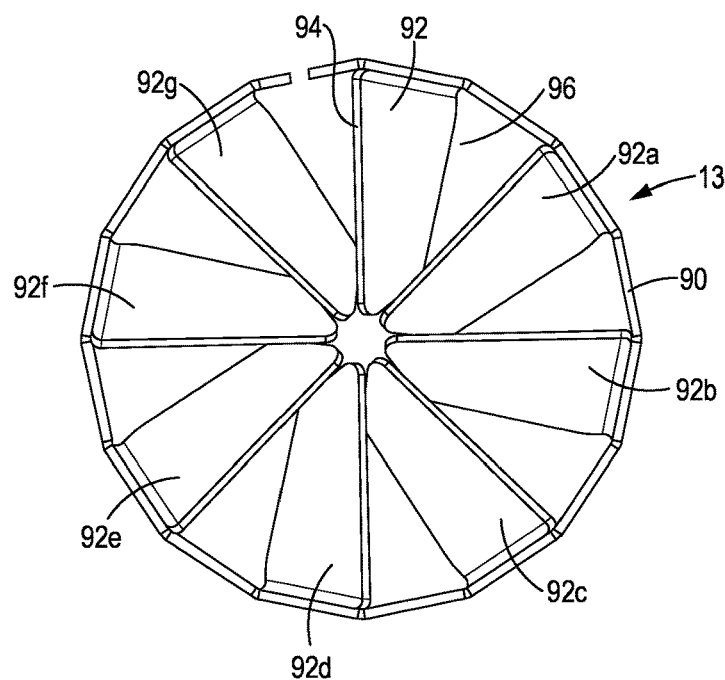
FIG. 10 shows a plan view of the upstream end of the second exhaust mixer blade assembly according to an embodiment of the disclosure.

FIG. 10 shows plan view of the upstream end of the second exhaust mixer blade assembly 13. As shown in FIG. 10, an upstream edge 94 of each swirl blades 92 is arranged to extend from the annular support 90 in a radial direction towards a central region of the annular support 90. When assembled, each of the swirl blades 92 is arranged to extend from the annular support 90 in a radial direction towards a central region of the exhaust conduit 14. As shown in FIG. 10, the swirl blades 92 may extend a substantial portion of the radial distance from the annular support 90 to the centre. For example, the swirl blades 92 may extend at least 50% of the radial distance, or more preferably at least 60 at least 70%, at least 75 at least 80 or at least 85% of the radial distance.

Each of the swirl blades 92 may be formed from a generally quadrilateral shape. The corners of the swirl blades may be rounded (chamfered) to improve exhaust fluid flow through the second exhaust mixer 12. For example, the generally quadrilateral shape may be a cuboid, trapezium, or parallelogram, or any other polygon.

The plurality of swirl blades 92 and the annular support 90 may be formed from a sheet material. Preferably, the plurality of swirl blades 92 and the annular support 90 may be formed from a unitary sheet material, and formed into the desired shape through bending processes. As such, the annular support 90 may be formed from a strip of sheet material comprising a plurality of bends along its length such that opposing ends of the strip 98, 99 are brought into close proximity through the formation of an annular shape.

The swirl blades 92 may be formed as protrusions which extend from the strip. The protrusions may be formed into swirl blades 92 by introducing further bends into the sheet of material forming the second exhaust mixer blade assembly 13. As shown in FIG. 9, each of the swirl blades 92 is bent about an axis which is inclined with respect to the elongate direction. Thus, the inclination of each swirl blade 92 is provided according to the orientation of the bend axis for each swirl blade 92 with respect to the elongate direction.

The second exhaust mixer blade assembly 13 may extend in the elongate direction by at least 20 mm. As such, a width of the annular support 90 may be at least 20 mm. The second exhaust mixer blade assembly may also extend in the elongate direction by no greater than 100 mm. As such, a width of the annular support 90 may be no greater than 100 mm.

Figure 11:
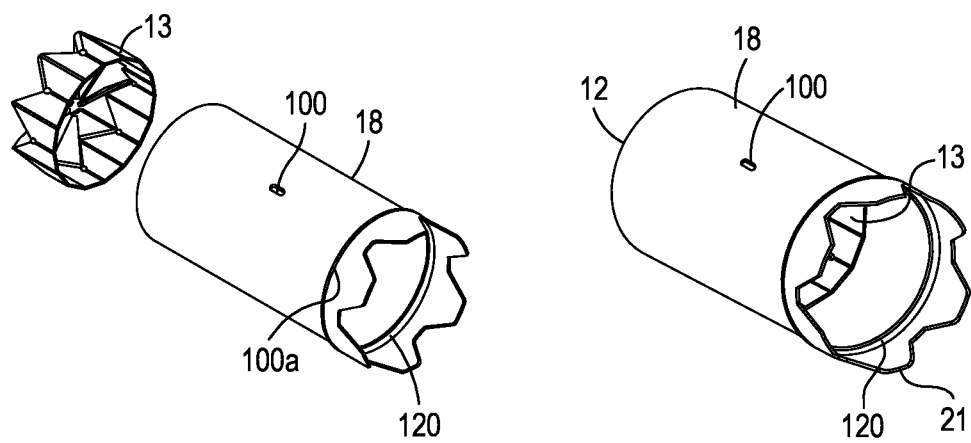
FIG. 11 shows a diagram of a step for assembling a second exhaust mixer according to an embodiment of the disclosure.

The second exhaust mixer blade assembly 13 may be assembled within an exhaust conduit 14. As shown in the embodiment in FIG. 11, the second exhaust mixer 12 may be assembled within the second support portion 18. The second support portion 18 may be substantially tubular, preferably a cylindrical tube. The second support portion 18 may include one or more through holes 100, 100a. The second exhaust mixer 12 may be assembled within the second exhaust mixer and aligned with the holes 100, 100a. The second exhaust mixer 12 may be connected to the second support portion 18 using the holes 100, 100a. In one embodiment, a weld may be used to join the second support portion 18 to the second exhaust mixer 12 at the holes 100, 100a. Alternatively, other attachment means, such as fasteners may be used.

Figure 12:
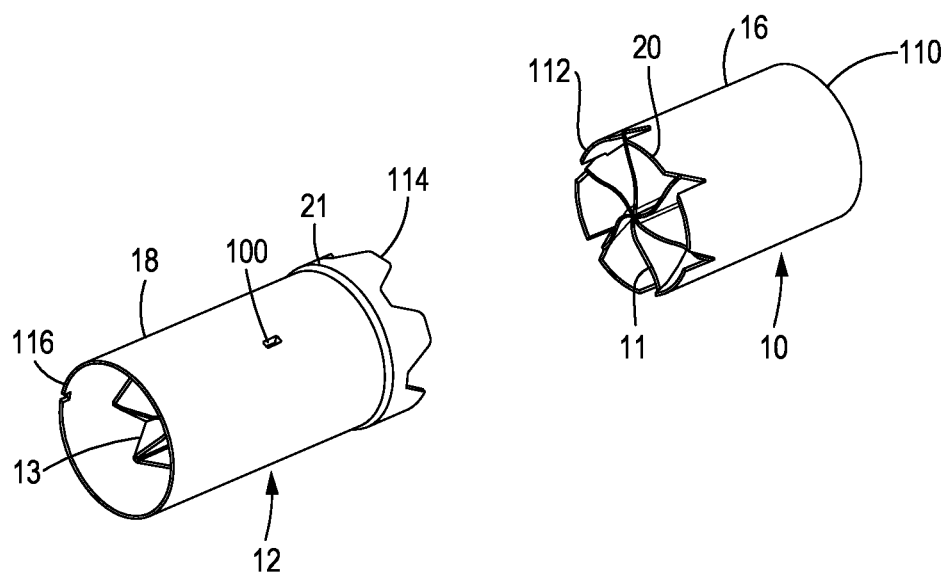
FIG. 12 shows an exploded diagram of an exhaust mixer apparatus comprising first and second exhaust mixers according to an embodiment of the disclosure.

As discussed above, the first support portion 16 may be connected to the second support portion 18 to form an exhaust conduit 14 at respective joining portions 20, 21. FIG. 12 shows an exploded isometric diagram of a first exhaust mixer 10 comprising a first support portion 16 and first exhaust mixer blade assembly 11, and a second exhaust mixer 12 including a second support portion 18 and second exhaust mixer blade assembly 13 according to an embodiment of the disclosure.

As shown in FIG. 12, the first support portion 16 includes an upstream end 110 and a downstream end 112. Upstream end 110 may form an inlet for the exhaust conduit 14. Downstream end 112 may include a joining portion 21 for joining the first and second support portions 16, 18. The second support portion 18 includes an upstream end 114 and a downstream end 116. Upstream end 114 of the second support portion 18 may include a complementary joining portion 21 for joining the first and second support portions 16, 18. Downstream end 116 of the second support portion 18 may form an outlet for the exhaust conduit 14.

Figure 13:
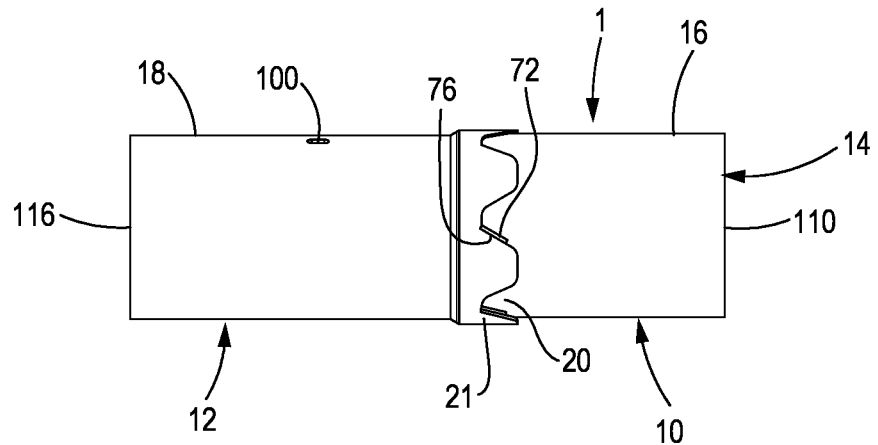
FIG. 13 shows a side view of an exhaust mixer apparatus according to an embodiment of the disclosure.

FIG. 13 shows a side view of the assembled exhaust mixer apparatus 1. As shown in FIG. 13, the joining portion 21 of the second support portion 21 may be configured to overlap with the joining portion 20 of the first support portion 16. As such, the internal diameter of the second support portion 18 may be configured to form a push fit with the outer diameter of the first support portion 18. In some embodiments, the internal diameter of the second support portion 18 may be constant along its lengths. In the embodiment shown in FIG. 13, the internal diameter of the main section of the second support portion 18 is substantially the same as the internal diameter of the first support portion 16. This is preferable in order to provide an exhaust conduit 14 of continuous internal diameter. A continuous internal diameter may be advantageous for the improving the uniformity of the exhaust fluid flow and improved mixing efficiency. Thus, the downstream end 112 of the first support portion 16 may abut a ridge 120 in the second support portion 18 in order to form a conduit 14 having a continuous internal diameter.

In some embodiments, the internal diameter of the exhaust conduit 14 may be at least 50 mm and no more than 150 mm. Of course, it will be appreciated that the internal diameter of the exhaust conduit 14 may be different from the above diameters depending on the desired flow rate of exhaust fluid and pressure drop considerations. The skilled person will appreciate that depending on the size of the internal combustion engine for which the exhaust conduit is to attached to, an appropriately sized exhaust conduit may 14 be provided.

Figure 14:
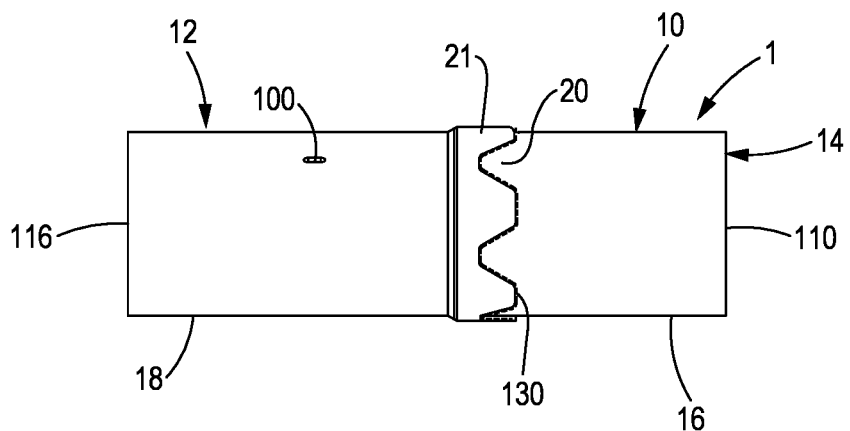
FIG. 14 shows side view of an exhaust mixer apparatus including a weld according to an embodiment of the disclosure.

FIG. 14 shows a diagram of the exhaust mixer apparatus 1 including a fixing between the first and second support portions 16, 18. The first and second support portions 16, 18 may be connected together by a weld. As shown in the embodiment in FIG. 14, a weld may be provided along an edge of the second joining portion 21 to connect it to the joining portion 20 of the first support portion 16. The weld may also join the tabs 72 of the first exhaust mixer 12 to the first and/or second support portion 16, 18. Preferably, as shown in the embodiment in FIG. 14, the weld may be a continuous weld which runs around at least part of the circumference of the joining portions 20, 21. More preferably, the weld runs around the entire circumference of the joining portions 20, 21 to form a single continuous weld. By joining the two joining portions 20, 21 and the tabs 72 using a single continuous weld, the weld may fluidly seal the first and second support portions 16, 18 of the exhaust conduit 14. Of course, the skilled person will appreciate that other configurations of joining portions 20, 21 for forming a fluid seal between two conduits may also be used.

Figure 15:
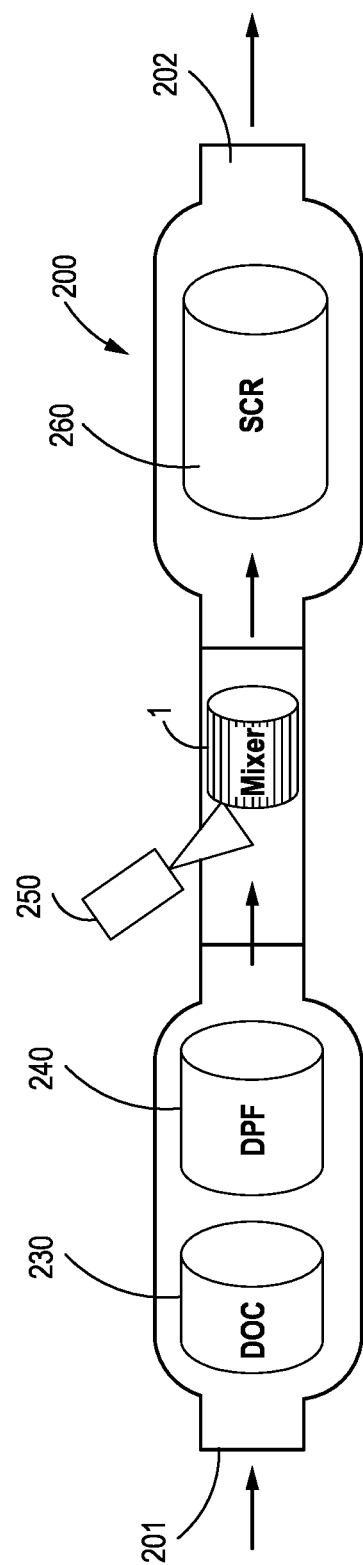
FIG. 15 shows a system diagram of an emissions cleaning module according to an embodiment of the disclosure.

According to another embodiment of the disclosure, the exhaust mixer apparatus 1 may be provided as part of an emissions cleaning module 200. A system diagram of an emissions cleaning module 200 according to an embodiment of this disclosure is shown in FIG. 15. An emissions cleaning module 200 may comprise an exhaust mixer apparatus 1 and an injector module 250. The injector module 250 may be configured to inject an additive fluid, for example a fluid comprising urea, into an inlet 110 of the exhaust mixer apparatus. The emissions cleaning module 200 may also comprise an inlet 201 for exhaust fluid, an outlet 202 for exhaust fluid and a conduit for exhaust fluid connecting the inlet 201 to the outlet 202. Part of the conduit for exhaust fluid may be provided by an end coupling 210.

The emissions cleaning module 200 may also comprise a diesel oxidation catalyst (DOC) module 230. The DOC module 230 may be configured to cause oxidation of hydrocarbons ([HC]) and carbon monoxide (CO) present in the fluid flow in order to produce carbon dioxide ($CO_2$) and water ($H_2O$). DOC modules 230 are known in the art and so art not further described herein. The emissions cleaning module 200 may also comprise a Diesel Particulate Filter (DPF) module 240. The DPF module 240 may be configured to filter carbon particulate (i.e. soot) from the exhaust fluid. DPF modules are known in the art and so are not further described herein.

The emissions cleaning module 200 also comprises a selective reduction catalyst (SCR) module 260. The SCR module 260 is located downstream of the injector module 250. The SCR module 260 may comprise a catalyst surface intended to cause a catalytic reaction between the two fluids mixed in the mixing conduit and output by the diffuser. The SCR module 260 may be configured to cause $NO_x$ and ammonia in the exhaust fluid passing over the surfaces of the catalyst of the SCR module 260 to react to convert the $NO_x$ to diatomic nitrogen ($N_2$) and water ($H_2O$).

In the system diagram of FIG. 15, the components of the emissions cleaning module 200 are shown in a linear arrangement. As such, the fluid flow path through the emissions cleaning module is substantially in a single (linear) direction. In some embodiments, the emissions cleaning module may be arranged to include various bends and deviations, such that the fluid flow path through the emissions cleaning module 200 is not substantially in a single direction.

In one embodiment of an emissions cleaning module, the fluid flow path through the emissions cleaning module may be directed around a bend using an end coupling 210. For example, an end coupling 210 may be provided between the DPF module 240 and the exhaust mixer apparatus 1 in system diagram of the emissions cleaning module 200 shown in FIG. 15.

Figure 16:
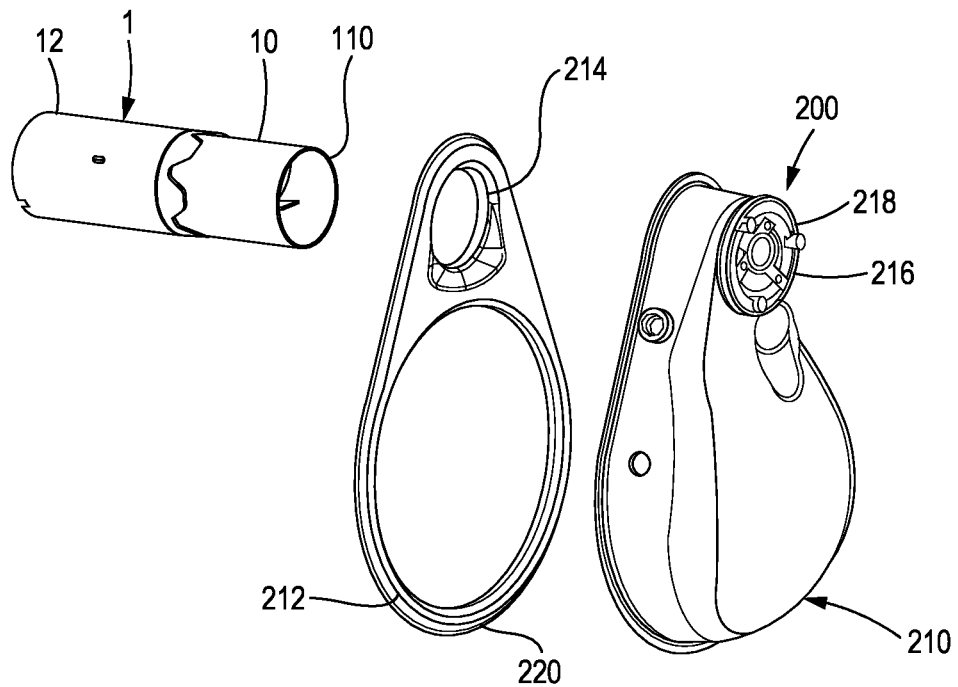
FIG. 16 shows an exploded diagram of part of an exhaust cleaning module according to an embodiment of the disclosure.
Figure 17:
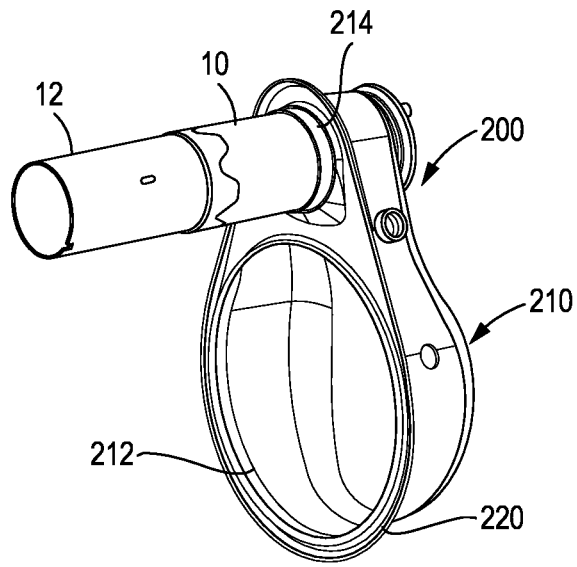
FIG. 17 shows an isometric view of part of an emissions cleaning module according to an embodiment of the disclosure.

An example of such an end coupling is shown in FIGS. 16 and 17. As shown in FIG. 16, an end coupling 210 provides part of a conduit for exhaust fluid in an emissions cleaning module. The end coupling 210 includes an inlet 212 for exhaust fluid and an outlet 214 for exhaust fluid. The inlet 212 of the exhaust coupling 210 is configured to receive an exhaust fluid which is then guided by a conduit formed by end coupling 210 to the outlet 214 of the end coupling 210. At a point along the end coupling 210, an injector module 250 may be arranged, such that an additive fluid may be injected into the conduit of the end coupling 210. In the embodiment of FIG. 16, the injector module 250 may be mounted on an injector mounting portion 216. The injector module 250 mounted on the injector mounting portion 216 may include an injector nozzle 218. The injector nozzle 218 provides a spray patter for additive fluid injected through the injector nozzle 218. As shown in the embodiment of FIG.

16, the injector nozzle 218 is generally aligned with the outlet 214 of the end coupling 210 and the inlet 110 of the exhaust mixer apparatus 1. The end coupling 210 may also comprise a sealing member 220. The sealing member 220 may be configured to provide a seal between the outlet 214 of the end coupling 210 and the exhaust mixer apparatus 1.

FIG. 17 shows an isometric diagram of part of an emissions cleaning module according to an embodiment of the disclosure. As shown in FIG. 17, the end coupling 210 is configured to receive an exhaust fluid at inlet 212 travelling in a first direction. The conduit of the end coupling 210 is shaped to bend the flow of exhaust fluid by 180° such that the direction of the exhaust fluid flow at the outlet 214 is opposite to the first direction.

Next, a method of operating the emissions cleaning module 200, comprising the exhaust mixer apparatus 1 will be described.

The emissions cleaning module 200 according to embodiments of this disclosure may form part of an exhaust system for an internal combustion engine. Exhaust fluid generated by an internal combustion engine may be supplied to the emissions cleaning module 1 via an inlet. Prior to receipt at the inlet, the pressure of the fluid may be controlled by a back pressure valve and/or a turbocharger waste gate.

Exhaust fluid may flow from the inlet of the emissions cleaning module 200 to the DOC module 230, and from the DOC module 230 to the DPF module 240. Exhaust fluid may pass from the DPF module 240 to the inlet 212 of the end coupling 210. Exhaust fluid may pass through the conduit of the end coupling 210 past the injector module 250 located on the end coupling 210. The injector module 250 may be associated with or attachable to a DEF pump unit. The DEF pump unit may comprise a tank for providing a reservoir for additive fluid to be injected by the injector. Such additive fluids may include urea or ammonia.

The DEF pump unit may further comprise a controller configured to control a volume of additive fluid to be injected from the tank by the injector. The controller may have as inputs, for example, temperature information and quantity of $NO_x$ information which may be derived from sensors in the SCR module 260.

Exhaust fluid may pass the injector module 250 where it may receive the injected additive fluid, for example urea, and the resultant mixture of exhaust fluid and additive fluid (urea) then passes into the exhaust mixer apparatus 1 from the outlet 214 of the end coupling 210.

The mixture of exhaust fluid and additive fluid may pass firstly through the first exhaust mixer 10. The mixture of exhaust fluid and additive fluid may pass along the first support portion 18 and through the first exhaust mixer blade assembly 11. The fluid flow may be distributed between the portions of the exhaust conduit 14 divided by the plurality of elongate mixing blades 30, 32, 34. The twist imparted on the elongate mixing blades 30, 32, 34 may impart a moderate amount of swirl on the fluid to turbulently mix the additive fluid with the exhaust fluid. The turbulent mixing may beneficially promote transfer of heat energy from the exhaust fluid to the additive fluid which may promote decomposition of the urea into ammonia. As the elongate mixing blades 30, 32, 34 are generally aligned with the direction of flow of the exhaust fluid and the additive fluid, the impact of the fluid flow on the first exhaust mixer is reduced. This reduces the amount of condensation of additive fluid on the elongate mixing blades 30, 32, 34. Any additive fluid which does condense at an upstream end of the first exhaust mixer 10 may be transported along the length of the first exhaust mixer 10 by the fluid flow. The heat from the fluid flow along the length of the first exhaust mixer may promote the evaporation and decomposition of the additive fluid (urea) into ammonia.

Fluid may then flow from the downstream end of the first exhaust mixer 10 to the second exhaust mixer 12. As the second exhaust mixer 12 is spaced apart from the first exhaust mixer 10, the degree of mixing of the additive fluid with the exhaust fluid at the second exhaust mixer may be increased relative to the mixing at the entrance of the exhaust mixer apparatus 1. This increased mixing may be due, at least in part, to the increased mixing time, and the mixing induced by the first exhaust mixer 10. As the additive fluid may be partially mixed with the exhaust fluid at this point, the second mixer may be provided to impart further swirl on the fluids to provide a more uniform mixing across a cross section of the exhaust conduit. That is to say, the flow uniformity of the exhaust fluid flow may be increased by the provision of the second exhaust mixer 12.

Exhaust fluid mixed with additive fluid may then pass via outlet the outlet 116 of the exhaust mixer apparatus 1. Exhaust fluid may flow from outlet 116 to the SCR module. The SCR module may comprise one or more catalysts through which the mixture of exhaust fluid and urea/ammonia may flow. As the mixture passes over the surfaces of the catalyst a reaction may occur which converts the ammonia and $NO_x$ to diatomic nitrogen ($N_2$) and water ($H_2O$).

The emissions cleaning module 200 may comprise other modules, as are known in the art in order to further treat the exhaust fluid, for example to comply with regulatory standards. It will be appreciated that the present disclosure is not limited to the above arrangement of an emissions cleaning module 200, and other combinations and orders of modules may be used to provide an emissions cleaning module in accordance with this disclosure. For example, in one alternative emissions cleaning module, the injector module 250 may be located between the DOC module 230 and the DPF module 240. The exhaust mixer apparatus 1 may be located downstream of the injector module 250, for example between the injector module 250 and the DPF module 240.

A method of manufacturing an exhaust mixer will now be described. In particular, the method of manufacturing an exhaust mixer may be used to manufacture a first exhaust mixer 10 according to an embodiment of this disclosure. The present method, however, is not limited to such an exhaust mixer, and may be used to manufacture other types of exhaust mixer.

According to an embodiment of the disclosure, a method of manufacturing an exhaust mixer may comprise assembling a plurality of elongate mixing blades each having a length extending in an elongate direction, and attaching at least part of an outer edge of one or more of the elongate mixing blades to a support. The plurality of elongate mixing blades may be assembled about an axis extending in the elongate direction. According to the method of manufacture, attaching the elongate mixing blade to the support imparts a twist about the axis on the elongate mixing blade along its length.

Next, a method of manufacturing a first exhaust mixer 10 will be described with reference to FIGS. 4-6. The components of the first exhaust mixer 10 have already been described in detail above, which apply equally to this embodiment.

As shown, in FIG. 4, a first elongate mixing blade 30 may be inserted into the first support portion 18. The outside edges of the first elongate mixing blade 30 may be provided by locating tabs 72, 72c, which may be aligned with the locating edges 74, 74c of the locating slots 70, 70c. By aligning the first elongate mixing blade with the locating slots 70, 70c of the first support 18 a twist may be imparted about the axis of the first elongate mixing blade 30. Preferably, the first support portion 18 may be configured to impart a twist of at least 10°, or more preferably at least 20°, along the length of first elongate mixing blade 30. Preferably, the first support portion may be configured to impart a twist of no greater than 40° on the elongate mixing blade along its length.

Preferably, each elongate mixing blade is formed from a planar material. For example, each of the elongate mixing blades is formed from a sheet material which may be shaped to provide the twisted configuration of the elongate mixing blades when assembled in the exhaust mixer 10.

As shown in FIG. 4, the first elongate mixing blade may be provided with an interlocking region 52 at an opposing end of the first elongate mixing blade 30 to aid with the assembly of the first exhaust mixer 10.

Next, as shown in FIG. 5 a second elongate mixing blade 32 is inserted into the first support portion 18. As for the first elongate mixing blade 30, the locating tabs 72b, 72e may be aligned with locating slots 70b, 70e of the first support 18 to impart a twist on the second elongate mixing blade 32. A first slot 60 of the interlocking portion 56 of the second elongate mixing blade 32 may be aligned with the interlocking region 52 of the first elongate mixing blade. Thus, the interlocking region 56 of the second elongate mixing blade 32 may be inserted into the slot 54 of the first interlocking portion 50 of the first elongate mixing blade 30.

A third elongate mixing blade 34 may be inserted into the first support portion 18 as shown in FIG. 6. As for the first and second elongate mixing blades 30, 32, the locating tabs 72a, 72d may be aligned with locating slots 70a, 70d of the first support 18 to impart a twist on the second elongate mixing blade 32. A first slot (not shown) of the interlocking portion 64 of the third elongate mixing blade 34 may be aligned with the interlocking regions 52, 58 of the first and second elongate mixing blades 30, 32. Thus, the interlocking region 66 of the third elongate mixing blade 34 may be inserted into the respective slots 54, 62 of the first and second interlocking portions 50, 56 of the and first and second elongate mixing blades 30, 32. Accordingly, the assembled structure as shown in FIG. 7 may be provided according to this method.

It will be appreciated that method of manufacture according to this disclosure is not limited to the order of performing the steps as described above. As such, the steps of interlocking the plurality of elongate mixing blades 30, 32, 34, and the steps of aligning the outer edges of the plurality of elongate mixing blades 30, 32, 34 may be carried out in any order. That is to say, the plurality of elongate mixing blades may be, for example, interlocked together to form an elongate mixing blade assembly 11 prior to insertion into the first support portion 18. Alternatively, some of the plurality of elongate mixing blades may be interlocked together prior to insertion, whilst further elongate mixing blades are inserted and interlocked in a subsequent step.

Preferably, the interlocking portions 50, 56, 64 of the plurality of elongate mixing blades 30, 32, 34 are arranged to align with the axis extending in the elongate direction when the plurality of mixing blades are assembled. As such, the interlocking portions 50, 56, 64 may be arranged in a substantially central portion of each the elongate mixing blades.

The plurality of elongate mixing blades 30, 32, 34 may be fixedly located with respect to the first support portion 18 by welding the plurality of elongate mixing blades 30, 32, 34 to the first support portion 18.

With reference to FIGS. 12-14, the support for locating the plurality of elongate mixing blades may comprise a first support portion 16 and a second support portion 18. The first and second support portions 16, 18, may be configured to define the one or more slots 70 for locating the elongate mixing blades 30, 32, 34 when assembled. For example, a first support portion 16 may be provided to define at least one locating edge 74 of a locating slot 72, whilst a second support portion may be provided to define at least one other edge of a locating slot 72. Preferably the second support portion 18 defines an opposing edge 76 (for example a locating edge 82 of the second support portion 18) of a locating slot 72 to the locating edge 74 of the first support portion 16. Thus, as shown in FIG. 13, the locating tabs 72 may be located between the locating edge 74 of the first support portion 16 and the opposing edge 76 of the second support portion 18.

As shown in FIG. 14, a weld may be provided around at least part of the circumference of the exhaust conduit 14 at the join between the first support portion 16 and the second support portion 18. Preferably, the weld is a continuous weld. More preferably, the weld is a continuous weld which extends around the circumference of the exhaust conduit at the join between the first support portion 16 and the second support portion 18. As such, the weld may join a joining portion 20 of the first support portion 16 to a joining portion 21 of the second support portion 18. Accordingly, the first and second support portions and the plurality of mixing blades may be attached together in a single joining process.

The method of manufacture according to this disclosure may also provide an exhaust mixer assembly 1. Said method of manufacture may further comprise attaching a swirl mixer, for example a second exhaust mixer blade assembly 13, to the support, for example second support portion 18 at a location spaced apart in the elongate direction from the plurality of elongate mixing blades. As shown in FIG. 13, the second exhaust mixer blade assembly 13 may be attached to the second support portion 18 by a fixing provided at one or more holes 100 in the second support portion 18. For example, the fixing may be a weld provided between the second exhaust mixer blade assembly 13 and the second support portion 18 at the one or more holes 100. Accordingly, an exhaust mixer assembly 1 comprising dual exhaust mixers may be provided.

According to the above described method, the first and/or second exhaust mixer blade assemblies 11, 13 may be manufactured from sheet materials. Accordingly, the above methods provide an economical method, both in terms of material cost and manufacturing time, for manufacturing an exhaust mixer or an exhaust mixer apparatus according to this disclosure.

Various examples according to this disclosure are set out in the following numbered clauses:

1. An exhaust mixer comprising:
   a plurality of elongate mixing blades each having a length extending in an elongate direction, the elongate mixing blades connected together along at least part of their lengths and arranged about the elongate direction, each elongate mixing blade comprising an outer edge extending in the elongate direction, wherein the elongate mixing blades are twisted along their lengths such that the outer edge of each elongate mixing blade is rotated about the elongate direction; and a support configured to locate the plurality of elongate mixing blades;

the support being locatable in, or forming part of, an emissions cleaning module or exhaust conduit 2. An exhaust mixer according to clause 1, wherein each of the plurality of mixing blades comprises:

a leading edge;

a trailing edge, and a plate like body extending between the leading edge and the trailing edge defining the outer edge of the mixing blade.

3. An exhaust mixer according to clause 1 or clause 2 wherein:

the outer edge of each elongate mixing blade is rotated by at least 10° along the length of the elongate mixing blade; and/or the outer edge of each elongate mixing blade is rotated by no greater than 40° along the length of the elongate mixing blade.

4. An exhaust mixer according to any preceding clause wherein, the exhaust mixer comprises at least 2 mixing blades, or more preferably at least 3 mixing blades.

5. An exhaust mixer according to any preceding clause, wherein the length of each mixing blade is at least 30 mm; and/or the length of each mixing blade is no greater than 200 mm.

6. An exhaust mixer according to any preceding clause, wherein the plurality of elongate mixing blades are configured to interlock with each other.

7. An exhaust mixer according to any preceding clause wherein the plurality of elongate mixing blades of the exhaust mixer are arranged about the elongate direction such that a centre of gravity of the plurality of elongate mixing blades is aligned with a central region of the exhaust conduit.

8. An exhaust mixer according to any preceding clause, further comprising a plurality of co-operative locating tabs and a plurality of co-operative locating slots configured to fixedly locate the mixing blades relative to the support.

9. An exhaust mixer according to clause 8, wherein the support further comprises the plurality of co-operative locating slots and each mixing blade comprises at least one of the plurality of the co-operative locating tabs.

10. An exhaust mixer according to clause 9 wherein the support comprises two conduits configured to define the plurality of co-operative locating slots when connected together.

11. A method of manufacturing an exhaust mixer comprising:

assembling a plurality of elongate mixing blades each having a length extending in an elongate direction, the plurality of elongate mixing blades assembled about an axis extending in the elongate direction;

attaching at least part of an outer edge of one or more of the elongate mixing blades to a support, wherein attaching the elongate mixing blade to the support imparts a twist about the axis on the elongate mixing blade along its length.

12. A method of manufacture according to clause 11, wherein the support is an exhaust conduit for an emissions cleaning module.

13. A method of manufacture according to clause 11 or 12, wherein the support imparts a twist of at least 10°, and/or no greater than 30° on the elongate mixing blade along its length 14. A method of manufacture according to any one of clauses 11 to 13, wherein the at least two of the plurality of elongate mixing blades comprise interlocking portions; and wherein assembling the plurality of elongate mixing blades comprises interlocking the plurality of elongate mixing blades at the interlocking portions.

15. A method of manufacture according to clause 14, wherein the interlocking portions of the plurality of elongate mixing blades are arranged to align with the axis extending in the elongate direction when the plurality of mixing blades are assembled.

16. A method of manufacture according to clause 14 or 15, wherein each elongate mixing blade comprises an interlocking portion.

17. A method of manufacture according to any one of clauses 14 to 16, wherein the interlocking portions are arranged in a substantially central portion of the at least two elongate mixing blades.

18. A method of manufacture according to any one of clauses 11 to 17, wherein the plurality of elongate mixing blades each comprise an attachment tab which defines an outer edge of the elongate mixing blade for attaching to the support.

19. A method of manufacture according to any one of clauses 11 to 18, wherein attaching at least part of the outer edges of the one or more of the elongate mixing blades to the support comprises attaching the at least part of the outer edge of the one or more elongate mixing blades to one or more slots defined by the support, the slots being angled with respect to the axis extending in the elongate direction in order to impart a twist on the elongate mixing blade.

20. A method of manufacture according to clause 19, wherein the one or more slots are angled with respect to the axis by at least 10°, and/or no greater than 40°.

21. A method of manufacture according to clause 19 or clause 20, wherein the support comprises two support portions configured to define the one or more slots when assembled.

22. A method of manufacture according to clause 21, wherein the two support portions and the plurality of mixing blades are attached together in a single joining process.

23. A method of manufacture according to any one of clauses 11 to 22, wherein the plurality of elongate mixing blades comprises at least three mixing blades.

24. A method of manufacture according to any one of claims 11 to 23, wherein each elongate mixing blade is formed from a planar material.

25. A method of manufacture according to any one of clauses 11 to 24, further comprising attaching a swirl mixer to the support at a location spaced apart in the elongate direction from the plurality of elongate mixing blades.

26. A method of manufacture according to any one of clauses 11 to 25 to manufacture an exhaust mixer according to any one of clauses 1 to 10.

INDUSTRIAL APPLICABILITY

The present disclosure provides an exhaust mixer, an exhaust mixer apparatus, an emissions cleaning module and a method of manufacturing an exhaust mixer and an exhaust mixer apparatus which may improve the efficiency of mixing an additive, such as urea, in a flow of exhaust fluid, such as exhaust gas.

Incomplete mixing of the urea, and hence inadequate decomposition of the urea to ammonia, when it is injected into an emissions cleaning module may lead to the formation of deposits of urea on the internal surfaces of the emissions cleaning module, in particular the exhaust conduit and any mixing device present therein. This can lead to the need for overly-frequent disassembly and maintenance of the emissions cleaning module.

In particular, the first exhaust mixer according to the present disclosure may reduce build-up of additives by introducing an initial amount of swirl to the exhaust fluid gradually along the length of the first exhaust mixer, and also by providing a surface which assists in the evaporation of additive fluid which may collect on the first exhaust mixer.

Further, the exhaust mixer apparatus of the present disclosure may result in an increased efficiency of mixing of the injected additive in the exhaust fluid flow.

In particular, the combination of the first exhaust mixer and the second exhaust mixer according to this disclosure may provide a two stage (dual) exhaust mixer apparatus which improves the mixing efficiency of the exhaust mixer apparatus. Preferably, the second exhaust mixer introduces a larger amount of swirl to the exhaust fluid than the first exhaust mixer. As the exhaust fluid and the additive fluid is already at least partially mixed at the point it reaches the second exhaust mixer, the spray impaction of the second mixer may be increased (to impart more swirl), without resulting in excessive amounts of additive fluid forming on the second exhaust mixer. Accordingly, the second exhaust mixer may be optimised to increase the swirl of the exhaust fluid to produce a uniform distribution of exhaust fluid and additive fluid across a substantial portion, if not all of, a cross-section of the exhaust conduit.

It will be appreciated that the above embodiments of the disclosure are provided by way of example only. Various modifications to, and combinations of, one or more of the above described embodiments of the invention will be apparent to the skilled person without departing from the scope of this disclosure.

The invention claimed is:

1. An exhaust mixer apparatus comprising:
an exhaust conduit configured to extend in an elongate direction comprising an inlet and an outlet for transporting exhaust fluid;
a first exhaust mixer comprising:
a plurality of elongate mixing blades each having a length extending in the elongate direction, the elongate mixing blades connected together along at least part of their lengths and arranged about the elongate direction, each elongate mixing blade comprising an outer edge extending in the elongate direction,
wherein the elongate mixing blades are twisted along their lengths such that the outer edge of each elongate mixing blade is rotated about the elongate direction, and
the exhaust conduit is configured to locate the first exhaust mixer in an upstream location of the exhaust conduit;
wherein the first exhaust mixer and the exhaust conduit further comprise a plurality of co-operative locating tabs and a plurality of co-operative locating slots configured to fixedly locate the mixing blades relative to the exhaust conduit, the plurality of co-operative locating slots are angled to induce a twist of the elongate mixing blades; and
a second exhaust mixer configured to impart a swirl on an exhaust fluid when in use, the second exhaust mixer arranged in the exhaust conduit downstream and spaced apart from the first exhaust mixer in the elongate direction.

2. An exhaust mixer apparatus according to claim 1, wherein the plurality of elongate mixing blades of the first exhaust mixer are configured to interlock with each other.

3. An exhaust mixer apparatus according to claim 1, wherein each of the plurality of mixing blades of the first exhaust mixer comprises:
a leading edge;
a trailing edge, and
a plate like body extending between the leading edge and the trailing edge defining the outer edge of the mixing blade.

4. An exhaust mixer apparatus according to claim 1, wherein:
the outer edge of each elongate mixing blade is rotated by at least 10° along the length of the elongate mixing blade; and/or
the outer edge of each elongate mixing blade is rotated by no greater than 40° along the length of the elongate mixing blade.

5. An exhaust mixer apparatus according to claim 1, wherein the first exhaust mixer comprises at least 2 mixing blades; and/or
the first exhaust mixer comprises no more than 8 mixing blades.

6. An exhaust mixer apparatus according to claim 1, wherein the length of each mixing blade of the first exhaust mixer is at least 30 mm; and/or
the length of each mixing blade is no greater than 150 mm.

7. An exhaust mixer apparatus according claim 1, wherein the plurality of elongate mixing blades of the first exhaust mixer are arranged about the elongate direction such that a centre of gravity of the plurality of elongate mixing blades is aligned with a central region of the exhaust conduit.

8. An exhaust mixer apparatus according to claim 1, wherein the second exhaust mixer is spaced apart from the first exhaust mixer by at least 10 mm; and/or
the second exhaust mixer is spaced apart from the first exhaust mixer by no greater than 350 mm.

9. An exhaust mixer apparatus according to claim 1, wherein the second exhaust mixer comprises at least 4 swirl blades.

10. An exhaust mixer apparatus according to claim 1, wherein the exhaust conduit comprises the plurality of co-operative locating slots and each elongate mixing blade of the first exhaust mixer comprises at least one of the plurality of the co-operative locating tabs.

11. An exhaust mixer apparatus according to claim 10 wherein the exhaust conduit comprises first and second conduit portions configured to define the plurality of co-operative locating slots when connected together.

12. An exhaust mixer apparatus according to claim 10, wherein the plurality of locating slots are angled with respect to the elongate direction by at least 20°, and/or no greater than 40°.

13. An exhaust mixer apparatus according to claim 1, wherein the second exhaust mixer comprises:
an annular support configured to extend around an inner surface of the exhaust conduit; and a plurality of swirl blades, each swirl blade configured to extend from the annular support and configured to impart a swirl on an exhaust fluid when in use.

14. An exhaust mixer apparatus according to claim 13, wherein each swirl blade comprises:
an upstream edge configured to extend from the annular support;
a downstream edge configured to extend from the annular support;
a plate like body configured to extend between the upstream edge and the downstream edge.

15. An exhaust mixer apparatus according to claim 14, wherein the upstream edge of each swirl blade of the second exhaust mixer is arranged to extend from the annular support in a radial direction towards a central region of the exhaust conduit.

16. An exhaust mixer apparatus according to claim 14, wherein a direction in which the plate like body of each swirl blade of the second exhaust mixer is configured to extend is inclined relative to the elongate direction.

17. An exhaust mixer apparatus according to claim 14, wherein an angle of inclination of the direction in which the plate like body of each swirl blade extends is at least 5°, and/or no greater than 30°.

18. An emissions cleaning module comprising:
an exhaust mixer apparatus according to claim 1; and
an injector module configured to inject an additive fluid into the inlet of the exhaust conduit of the exhaust mixer apparatus.

19. An emissions cleaning module according to claim 18, wherein the inlet of the exhaust conduit is in fluid communication with an end coupling for supplying exhaust fluid to the exhaust mixer apparatus.

20. An emission cleaning module according to claim 19, wherein the injector module is mounted in the end coupling, or at a point along the exhaust conduit.

* * * * *